J. R. ROGERS
INTERNAL COMBUSTION ENGINE.
APPLICATION FILED MAR. 31, 1911. RENEWED JULY 6, 1914.
1,127,810.
Patented Feb. 9, 1915.
4 SHEETS—SHEET 4.
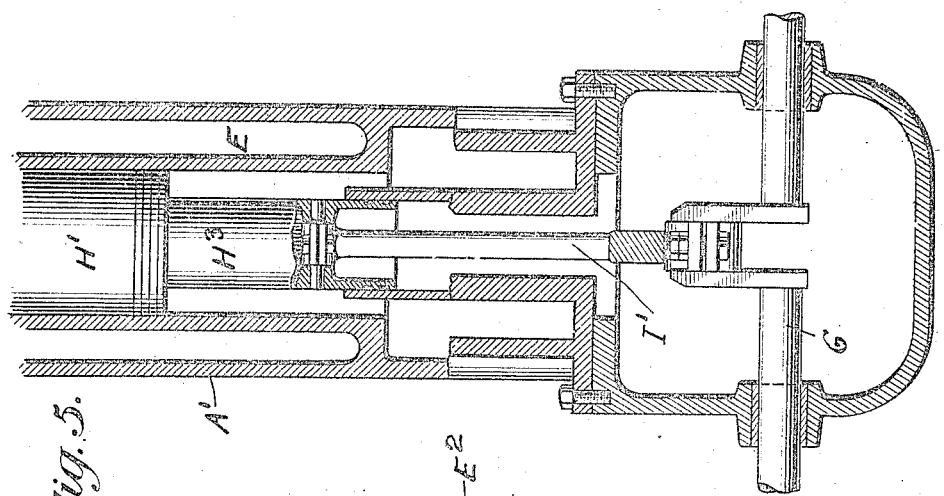
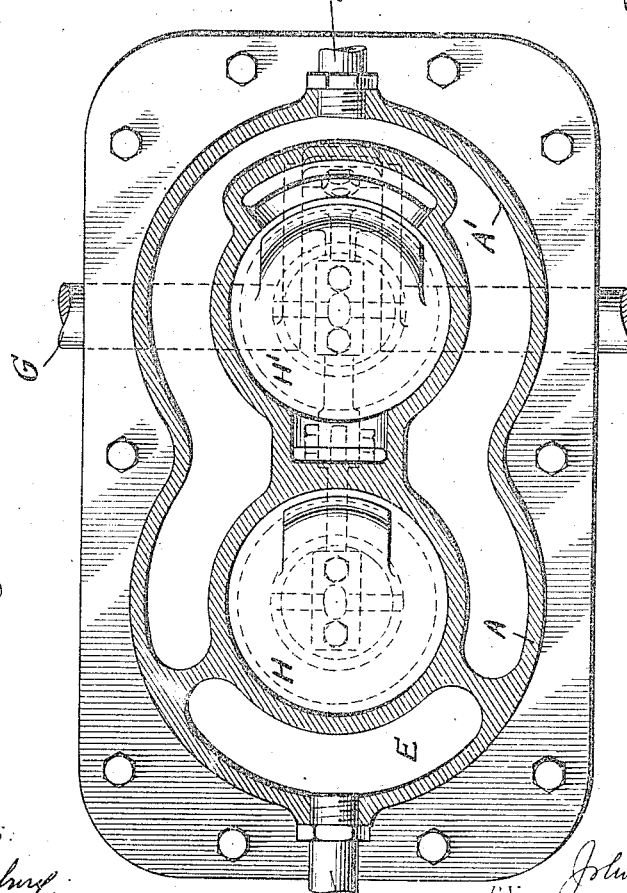

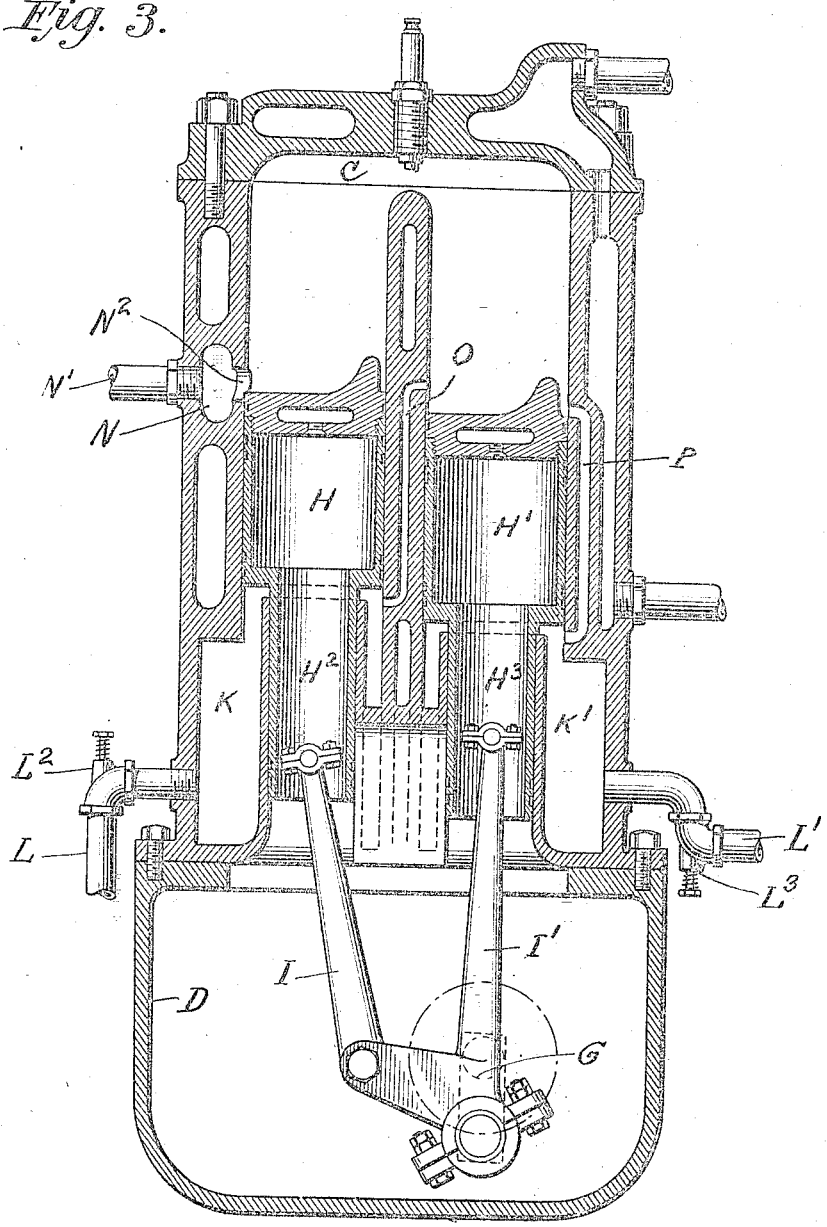

UNITED STATES PATENT OFFICE.

JOHN R. ROGERS, OF BROOKLYN, NEW YORK.

INTERNAL-COMBUSTION ENGINE.

1,127,810.  Specification of Letters Patent.  Patented Feb. 9, 1915.

Application filed March 31, 1911, Serial No. 618,185. Renewed July 6, 1914. Serial No. 849,245.

*To all whom it may concern:*

Be it known that I, JOHN R. ROGERS, a citizen of the United States, residing in the borough of Brooklyn, county of Kings, and State of New York, have invented certain new and useful Improvements in Internal-Combustion Engines, of which the following is a specification.

My invention relates to internal combustion engines and the object is to provide an engine of the two cycle or two phase type which shall be simple in construction and which shall provide a more certain means of obtaining a regular and efficient action of the engine with fewer parts than heretofore. One means of obtaining this object is secured by certain scavenging of the burnt gases by air previous to the introduction of the explosive charge and consists in certain arrangements and relationships of the parts to accomplish this object in very simple form and with exceedingly slight liability of disarrangement, as will be hereinafter described.

Other objects and advantages will appear from the following description taken in connection with the accompanying drawings which illustrate one means of carrying out my invention.

I have shown my invention as applied in a form adapted for use especially in connection with an automobile, or a motor boat, but it can be applied to other purposes without change of the principle involved.

Figure 1:
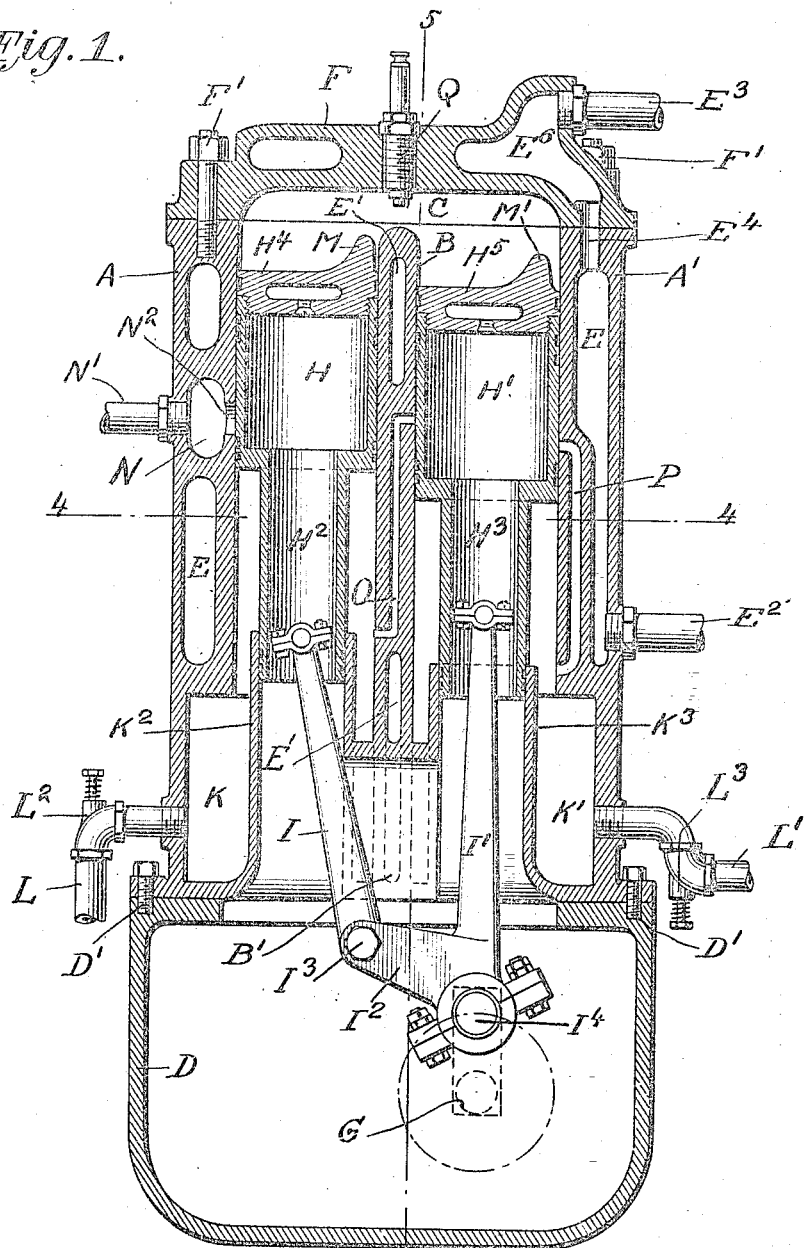
Figure 2:
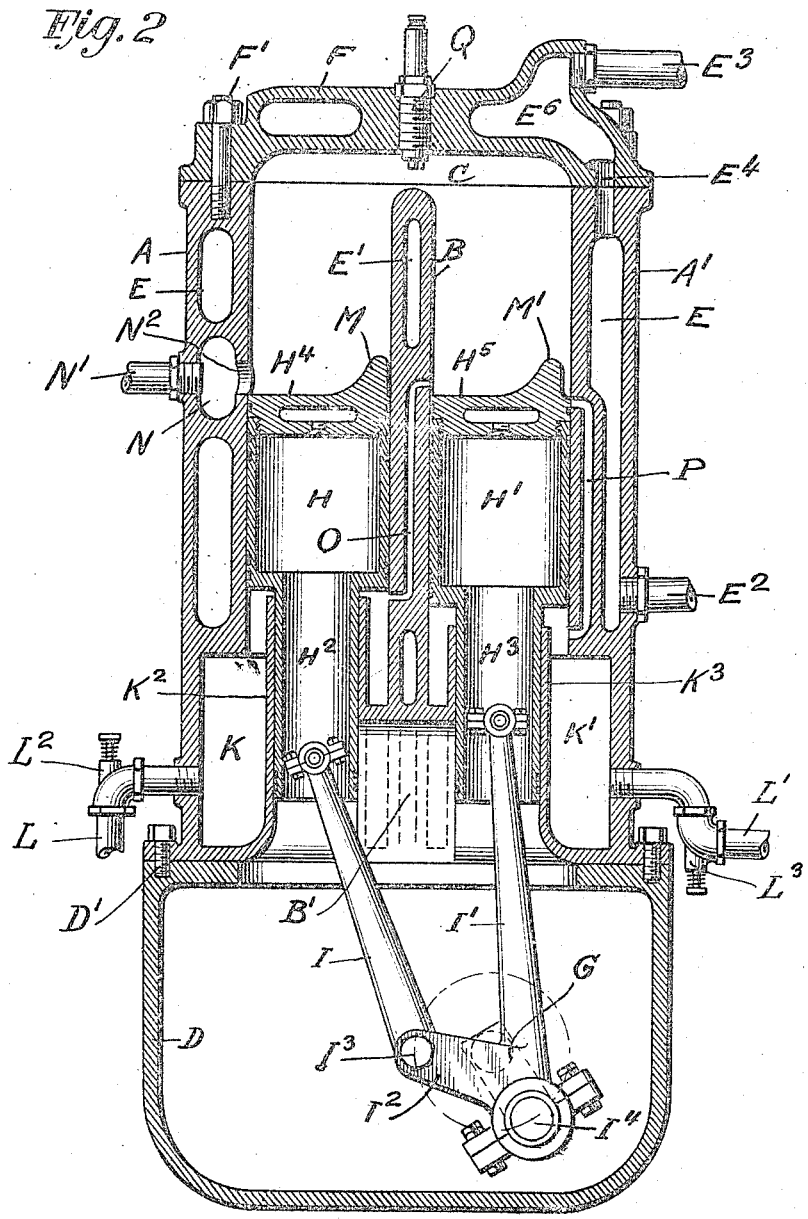

In the drawings, Figure 1 is a vertical sectional view through the center of the cylinder and crank case of an engine constructed according to my invention, showing the relationship of the parts when the explosive charge is compressed and ready to be exploded. Fig. 2 is a view similar to Fig. 1, showing the pistons near the lower end of their movement, the lefthand piston having reached the point of its extreme downward movement and the righthand piston approaching the end of its movement. Fig. 3 is a view similar to Fig. 1, showing the lefthand piston beginning its return movement and the righthand piston having reached the point of its extreme downward movement. Fig. 4 is a transverse sectional view along the line 4—4 of Fig. 1; and Fig. 5 is a vertical sectional view along the line 5—5 of Fig. 1.

Similar letters of reference indicate similar parts throughout the several views.

A, A' indicate twin cylinders formed of a single casting, the cylinders being separated from each other by a wall B and having a common explosion chamber C at the upper end of the cylinders.

D represents a crank case on which the cylinders A, A' are supported and to which they are fastened by any suitable means, such as bolts D', D'. The cylinder casting is provided with water chambers E, E in its walls and the wall B is provided with suitable water chambers E', E', all of said water chambers comprising a single water circulating system, the water inlet pipe being designated by $E^2$ and the water outlet pipe being designated by $E^3$.

F indicates a cover for the cylinders fastened to the cylinder casting by any suitable means, such as bolts F', F'.

$E^4$ is a channel connecting the water circulating system of the cylinder casting with the water chamber $E^5$ in cover F, the water outlet pipe $E^3$ leading from the water chamber $E^5$.

The cylinders A, A' are offset with relation to the crank-shaft G in order to obtain a differential motion of the pistons H, H'. Pistons H, H' are of the double-sized or two-bore type and are connected by means of suitable cross-heads with connecting-rods I, I'. Connecting-rod I' may be cast integral with arm $I^2$ to which connecting-rod I is pivoted by pin $I^3$. Arm $I^2$ is mounted on pin $I^4$ in turn mounted on crank-shaft G. Wall B is slotted at the bottom as at B' in order to provide room for the movement of the connecting-rods I, I'.

K and K' indicate the air compression chamber and gas compression chamber respectively, said chambers being formed between the walls of the cylinder casting, the pistons H, H', and castings $K^2$ and $K^3$ respectively, the air chamber K and the gas chamber K' being separated from each other by wall B. Castings $K^2$ and $K^3$ form bearings for the smaller sized bores $H^2$ and $H^3$ of pistons H and H' respectively. The passage of air to the air chamber K is controlled by a suitable check valve $L^2$ in air pipe L and the passage of gas into the gas chamber K' is controlled by a suitable check valve $L^3$ in gas pipe L' leading from the carbureter (not shown). The heads $H^4$, $H^5$ of pistons H and H' respectively are secured in the ends of the pistons by any suitable means, such as being screwed there- 1, and each of them is provided with an air chamber as shown and a deflector M and M' respectively.

N is a circumferential chamber in the wall of the lefthand cylinder A to act as an exhaust chamber and is connected by a pipe N' to a suitable muffler (not shown) or to the open air.

N² is a circumferential slot in the wall of cylinder A forming, when uncovered, a means of communication between the interior of the cylinders and the exhaust chamber N. In the wall B between cylinders A and A' is cast a passage O forming a means of communication between the two cylinders A and A'; the lower end of said passage being in open communication with air chamber K and the upper end of the passage being controlled by the movement of piston H', this end of the passage being opened by the passing of said piston beyond it in the downward movement of the piston.

P is a passage cast in the wall of the righthand cylinder A' forming a means of communication between the gas chamber K' and cylinder A', the lower end of the passage being in open communication with gas chamber K' and the upper end being covered by piston H' until it is opened by the extreme downward movement of said piston, as shown in Fig. 3.

Q is a spark plug of any suitable construction.

The operation of the device illustrated is as follows: A charge having been previously introduced and compressed in explosion chamber C is fired in the usual way by the spark plug Q. Both pistons H and H' descend under the force of the explosion until piston H passes the slot N² communicating with the exhaust chamber N allowing the contents of both cylinders to exhaust into chamber N and thence through pipe N'. The opening N² between exhaust chamber N and the interior of the cylinders is of considerable size, and circumferential with relation to the cylinders. Because of the size and form of this opening into the exhaust chamber N, the descent of piston H uncovers a comparatively large area of the same very rapidly and before piston H' in its descent opens the upper end of the passage O. The burnt gases in both cylinders therefore will escape to a large extent into exhaust chamber N before the upper end of passage O is opened. The compression chamber K contains air only and this air is considerably compressed by the descent of the piston H, the check valve L² closing, so that when the upper end of passage O is opened, compressed air will rush through passage O into the righthand cylinder driving the residue of the burnt gases out of this cylinder into the other cylinder and thence into the exhaust chamber N, thus scavenging or cleansing the cylinders of the burnt gases.

The gas compression chamber K' through pipe L' is connected with a suitable carbureter containing a charge of air mixed with gasolene or other combustible vapor which is drawn in by the upper movement of piston H'. When piston H' descends the check valve L³ closes and the charge is compressed in chamber K' until by the descent of piston H' the upper end of passage P is opened, whereupon the compressed charge will pass from the compression chamber K' through passage P over deflector M' of head H⁵ into the upper part of explosion chamber C. It will be observed (Fig. 3) that this passing of the charge from gas compression chamber K' into the explosion chamber C is subsequent to the scavenging of the cylinders by the air from compression chamber K, and that the opening N² into the exhaust is already beginning to be closed by the upward movement of piston H, allowing just a sufficient opening for any residue of burnt gases to escape, the closure of N² being complete by the time the gas escaping from passage P reaches said opening N². The total volume of the contents of the two chambers K, K' being equal or nearly equal to the volume capacity of the explosion chamber C, the entire portion of the burnt gases will be expelled into exhaust chamber N before chamber C is filled with a fresh charge, thus leaving the mixture of air or gaseous vapor nearly or quite pure. The revolution of the main crankshaft G now carries pistons H and H' upward, drawing air and gas into the respective chambers K and K' through pipes L and L' respectively and past check valves L² and L³ respectively. As the pistons H and H' descend check valves L² and L³ are closed so that the contents of chambers K and K' may be compressed by the movement of the pistons as hereinbefore described. In this cycle it will be observed that there is a power impulse at every downward or outward movement from the explosion chamber, that at the end of the power impulse when nearing the extreme downward motion of the pistons the exhaust from both cylinders first takes place, then a scavenging action by the air compressed in chamber K, then the closing of the exhaust and finally the introduction and upward compression of a charge of air and vapor from compression chamber K'.

The above mentioned results are obtained through the use of two compression chambers and the differential movement of pistons H and H'. This differential movement by which the piston H arrives at the limit of its motion a little in advance of piston H' and begins its return also a little in advance enables the upper ends of passages O and P to be uncovered and covered alternately so as to obtain the successive actions above described.

It will be observed that there is a volume of air between the charge and the burnt gases and that the pressure of the compressed charge drives the air ahead of it and the burnt gases ahead of the air, so that if a small portion of the charge escapes into the exhaust chamber N no harm will be done. This enables the exhaust slot or port N² between the cylinders and the exhaust chamber N, and the exhaust chamber itself to be made of considerable size so as to allow a complete and thorough exhaustion of the burnt gases while at the same time a pure mixture of air and gas is provided for compression and combustion. It will also be observed that it is almost impossible for a back fire to occur with the construction which I have shown. At no time is there any direct communication between the burnt gases and the "incoming charge." The air passing from the chamber K is much cooler than the gases which it expels and has a cooling effect upon the walls of the cylinders. It will also be observed that the charge which is drawn into the chamber K′ comes into this chamber at atmospheric pressure, is considerably compressed, then discharged through the passage P and finally recompressed in explosion chamber C on the upward movement of the pistons, thereby giving a more thorough mixture of the air and gas than can be obtained in the ordinary two cycle engine.

I have shown only one power unit, but it is obvious that for use in automobiles or motor boats and other constructions, two or more such power units as shown might be used in association together. As a matter of comparison, it may be said that three such twin cylinders used in an automobile would give the same torque as is now obtained in a 6-cylinder engine of the four cycle type, and at the same time avoid the use of valves, cam shafts with their gears, cams and other parts necessary in such a construction. It will also be observed that because of pistons H and H′ being open at the lower end and communicating directly with the crank case, the ordinary method of splash lubrication may be utilized and that through this means all working parts of the engine will be sufficiently lubricated in the easiest and most effective manner. It will further be observed that by disconnecting bolts F′, F′ and water outlet pipe E³, the cover F may be readily removed, affording easy access to the interior of the cylinders. The cylinder casting itself may be readily removed from the crank case in D as is obvious from the inspection of the drawings.

I have heretofore in my application Serial No. 571,142, filed July 9, 1910, described and claimed my invention broadly, showing however a different construction of the air and gas compression chambers, means for supplying them with air and gas respectively, and means for controlling the passing of air and gas into the explosion chamber.

It is to be understood that the device described and claimed herein is but an alternative form of construction, illustrating the application of the same principles heretofore claimed broadly.

I do not here claim my new engine broadly as the present invention is but an improvement on the invention already described and claimed in the features mentioned.

In this specification and the claims appended hereto, where I refer to a "twin cylinder" I mean two cylinders having a common combustion head and so arranged that both cylinders may be exhausted and charges introduced into both cylinders from either cylinder. Such a "twin cylinder" may be of two separate castings with connecting pistons, or in a single casting, as shown in the drawings. In such a twin cylinder construction the connecting-rods from the working pistons are connected to the crank-shaft at substantially the same point of the crank-shaft revolution, and where I refer to a common driving shaft, I mean to refer to such a construction.

What I claim and desire to secure by Letters Patent of the United States is:

1. In an internal combustion engine the combination of twin cylinders, a common explosion chamber, compression chambers, a two diameter piston in each cylinder and a bearing for each of said pistons, the larger diameter of each of the pistons forming one side of each of the compression chambers and the smaller diameter coacting with the bearing.

2. In an internal combustion engine the combination of twin cylinders, a common explosion chamber, a compression chamber in each of said cylinders, a two diameter piston in each cylinder and a bearing for each of said pistons, the larger diameter of each of the pistons forming one side of each of the compression chambers and the smaller diameter co-acting with the bearing.

3. In an internal combustion engine the combination of a plurality of cylinders, an explosion chamber adjacent thereto, compression chambers, a two diameter piston in each of said cylinders and a bearing for each of said pistons, the larger diameter of each of the pistons forming one side of each of the compression chambers and the smaller diameter co-acting with the bearing.

4. In an internal combustion engine the combination of a crank case, twin cylinders supported thereon, a common explosion chamber, a compression chamber in each of said cylinders, a two diameter piston in each cylinder open at one end to the crank case and a bearing for each of said pistons, the larger diameter of the piston forming one side of the compression chamber and the smaller diameter co-acting with the bearing.

5. In an internal combustion engine the combination of a cylinder, an explosion chamber, a compression chamber, a passage from the compression chamber to the explosion chamber, an exhaust from said explosion chamber, a two diameter piston adapted to control the opening and closing of said passage and exhaust and a bearing for said piston, the larger diameter of the piston forming one side of the compression chamber and the smaller diameter co-acting with the bearing.

6. In an internal combustion engine the combination of a twin cylinder, a common explosion chamber, a compression chamber in each cylinder, one for air and the other for the charge, a passage from the air compression chamber into one of said cylinders, a passage from the charge compressing chamber into said last named cylinder, an exhaust from the other of said cylinders, a two diameter piston in each of said cylinders and a bearing for each of said pistons, the larger diameter of each of the pistons forming one side of each of the compression chambers, and the smaller diameter co-acting with the bearing, one of said pistons controlling the passages for air and the charge and the other of said pistons controlling the exhaust.

7. In an internal combustion engine the combination of a plurality of cylinders, a common explosion chamber, a compression chamber in each of said cylinders, a two diameter piston in each of said cylinders and a bearing for each of said pistons, the larger diameter of each of said pistons forming one side of each of said compression chambers, and the smaller diameter co-acting with the bearing, an exhaust and passages for the admission of air and gas to said cylinders, the parts being so arranged with relation to each other that the movement of the pistons permits successively and in the order named the exhaust to be opened, the burnt charge to be scavenged, the exhaust to be partially or wholly closed, and a new charge admitted and compressed.

8. In an internal combustion engine the combination of a twin cylinder, a common explosion chamber, a compression chamber in each cylinder, a two diameter piston in each cylinder and a bearing for each of said pistons, the larger diameter of each of said pistons forming one side of each of said compression chambers and the smaller diameter co-acting with the bearing, with means for imparting a differential movement to said pistons whereby in turn and in the order named the burnt charge may be exhausted, the cylinders scavenged, the exhaust partially or wholly closed and a new charge admitted and compressed.

In testimony whereof I have signed this specification in the presence of two subscribing witnesses.

JOHN R. ROGERS.

Witnesses:
 DAVID S. KENNEDY,
 ARTHUR P. PAINE.